(12) United States Patent
Williams et al.

(10) Patent No.: US 8,230,612 B1
(45) Date of Patent: Jul. 31, 2012

(54) INSTALLED FLIGHT CONTROL ROD STRAIGHTNESS CHECK TOOL

(75) Inventors: Jarrod Williams, Bellevue, NE (US); Robert Posey, Haughton, LA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/074,264

(22) Filed: Mar. 29, 2011

Related U.S. Application Data

(60) Provisional application No. 61/323,028, filed on Apr. 12, 2010.

(51) Int. Cl.
*G01B 5/25* (2006.01)
(52) U.S. Cl. .......................................................... 33/533
(58) Field of Classification Search ................... 33/533, 33/613, 645
See application file for complete search history.

(56) References Cited

U.S. PATENT DOCUMENTS

| | | | | |
|---|---|---|---|---|
| 4,851,760 A * | 7/1989 | Luebke | ............................ | 33/533 |
| 5,121,549 A * | 6/1992 | Gudausky, Jr. | ................. | 33/533 |
| 5,185,937 A * | 2/1993 | Piety et al. | ....................... | 33/645 |
| 5,189,798 A * | 3/1993 | La Force | ......................... | 33/533 |
| 6,195,905 B1 * | 3/2001 | Cole | .............................. | 33/533 |
| 6,240,648 B1 * | 6/2001 | Dolph | ............................. | 33/645 |
| 2004/0255481 A1 * | 12/2004 | Haynes | ........................... | 33/645 |
| 2007/0094879 A1 * | 5/2007 | Plantz | ............................. | 33/533 |
| 2011/0252658 A1 * | 10/2011 | Knudsen | ......................... | 33/645 |

* cited by examiner

*Primary Examiner* — G. Bradley Bennett
(74) *Attorney, Agent, or Firm* — AFMCLO/JAZ; Jeffrey Moore

(57) ABSTRACT

An apparatus and method for assessing the straightness of a flight control rod installed in an aircraft. The apparatus including a solid straight bar with a first end and a second end and two rod fixtures. The bar removably attachable to the rod fixtures that are in turn removably attachable to a flight control rod. The flight control rod may be removably inserted into rod fixture rod slots such that there is a measurable gap between the bar attached to the rod fixtures and the flight control rod to which they are attached.

12 Claims, 2 Drawing Sheets

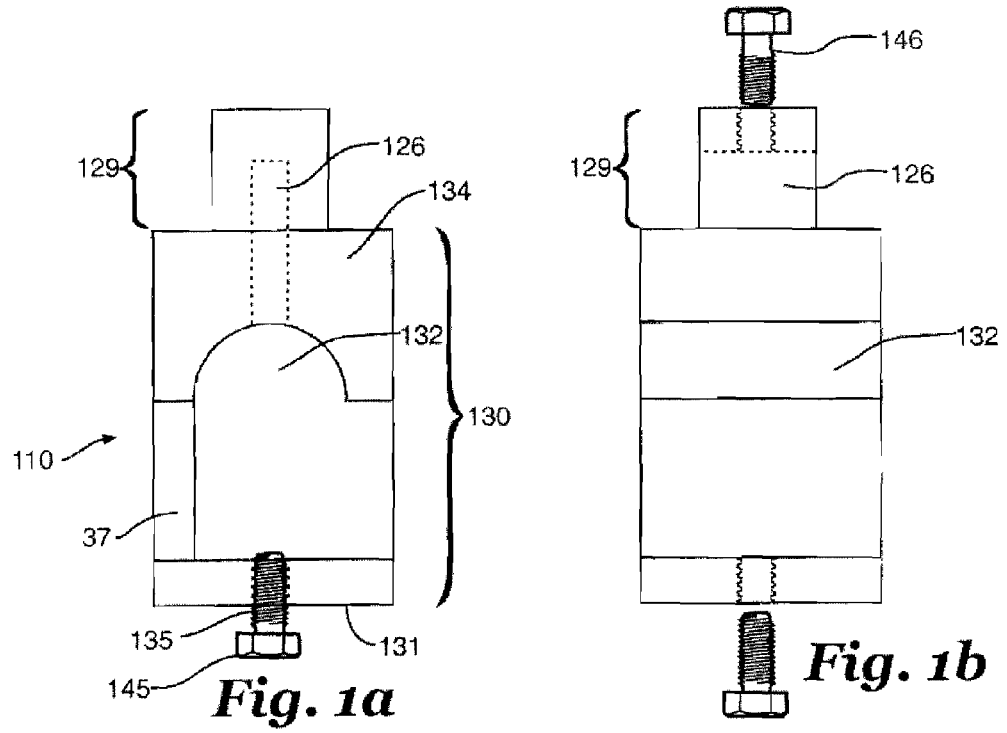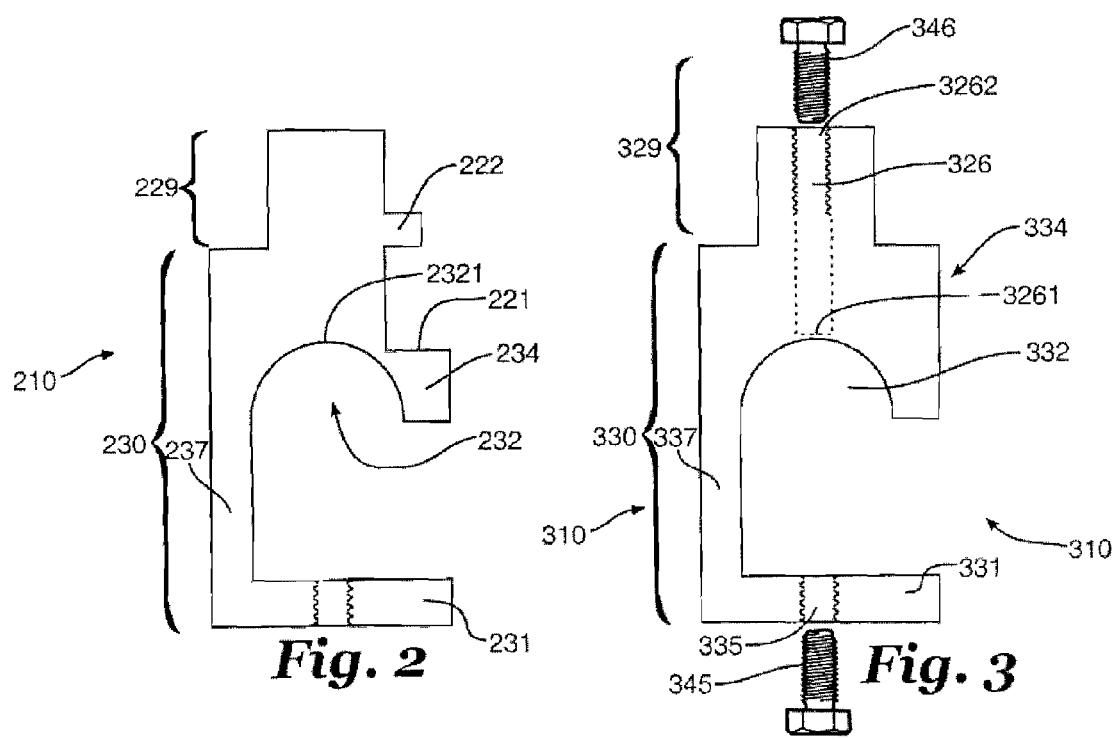

US 8,230,612 B1

INSTALLED FLIGHT CONTROL ROD STRAIGHTNESS CHECK TOOL

PRIORITY

This application claims priority from the USPTO provisional patent application entitled "FLIGHT CONTROL ROD STRAIGHTNESS CHECK TOOL" filed on Apr. 12, 2010, Ser. No. 61/323,028 which is hereby incorporated by reference.

RIGHTS OF THE GOVERNMENT

The invention described herein may be manufactured and used by or for the Government of the United States for all governmental purposes without the payment of any royalty.

BACKGROUND OF THE INVENTION

The invention relates to a method and tool for the nondestructive testing of the straightness of aircraft control rods without removal.

Prior aircraft control rod straightness inspections, if done, required the removal of the control rod from the aircraft. This process could take tens of man hours to complete. One estimate was over 24 hours.

While employed by the US Air Force to inspect aircraft, applicants devised an alternate tool and method for inspection that has since been adopted by the Air Force on several Aircraft. This new tool and method has the potential to save many hours of inspection time.

SUMMARY OF THE INVENTION

An apparatus and method for assessing the straightness of a flight control rod installed in an aircraft. The apparatus including a solid straight bar with a first end and a second end. A first rod fixture having a first bar block. The first bar block having a first bar slot. The first bar block affixed to a first rod block. The first rod block having a first base affixed to a first side member, the first side member affixed to a first rod cap forming a first rod slot. The apparatus may further include a second rod fixture having a second bar block. The second bar block having a second bar slot where the second bar block is affixed to a second rod block. The second rod block may have a second base affixed to a second side member. The side member affixed to a rod cap forming a second rod slot. The first bar end may be removeably inserted into the first bar slot, the second bar end removeably inserted into the second bar slot. The flight control rod may be removeably inserted into the first rod slot and the second rod slot with a measurable gap between the bar and the flight control rod.

The apparatus for assessing the straightness of a flight control rod installed in an aircraft may further include a first base screw protruding and operably attached to the first base wherein the first base screw may removably attach the first rod fixture to the flight control rod. The flight control rod may be disposed in the first rod slot. The second base may include a second base screw protruding and operably attached to the second base and removably attach the first rod fixture to the flight control rod disposed in the second rod slot.

The apparatus for assessing the straightness of a flight control rod installed in an aircraft may be designed such that the first and second bar slot respectively extend into and about above the rod block into the bar block; and further does not extend completely through the bar block. The first and second bar slot may be designed such that they respectively extend above the rod block through the bar block; and wherein the bar end is removably inserted into the bar slot and held in place by a set screw removably inserted into a portion of the bar slot above the bar end.

One embodiment of the present invention includes a method of assessing the straightness of a flight control rod while installed in an aircraft. The method including assembling two rod fixtures and a straight bar. Attaching the rod fixtures to the flight control rod. Measuring a plurality of gaps between the bar and the flight control rod. Rotating the bar and rod fixtures about the flight control. Remeasuring a plurality of second gaps between the bar and the flight control rod and using the plurality of gap measurement results to determine if the flight control rod is straight enough for continued use. The method may further include loosening the rod fixtures before rotating the bar and rod fixtures and tightening the rod fixtures before remeasuring the gap, rotation about the control rod is in increments of at least ten degrees and tightening the rod fixtures to the flight control with a base screw and then tightening the straight bar with a set screw as needed.

BRIEF DESCRIPTION OF THE DRAWINGS

FIG. 1a is an illustration of one embodiment of the present invention;

FIG. 1b is a 90-degree view of the same rod fixture embodiment as shown in FIG. 1a;

FIG. 2 is an illustration of another embodiment of a rod fixture;

FIG. 3 is an illustration of another embodiment of a rod fixture;

DETAILED DESCRIPTION

The present invention includes an apparatus and method for measuring the straightness of aircraft flight control rods.

Figure 6:
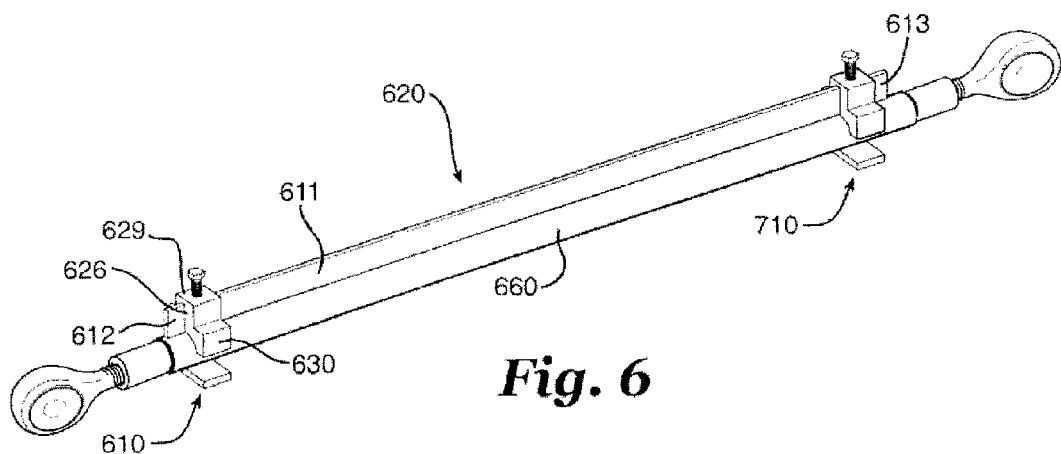
FIG. 6 is an illustration of one embodiment of the present invention installed on a flight control rod.

One embodiment of the disclosed apparatus is shown assembled on a flight control rod in FIG. 6.

FIG. 6 shows an apparatus 620 for assessing the straightness of a flight control rod 660 installed in an aircraft comprising a solid straight bar 611 with a first bar end 112 and a second bar end 613. A first rod fixture 610 having a first bar block 629. The first bar block 629 having a first bar slot 626 and affixed to a first rod block 630. The first rod fixture details are further described in FIG. 1a, 1b, 2 and 3. A second rod fixture 710 is shown attached to the second bar end 613 and the flight control rod 660. The second rod fixture 710 is functionally identical to the first rod fixture 610. The two rod fixtures may alternatively include any combination of the embodiments herein disclosed.

One embodiment of the disclosed apparatus is shown in FIGS. 1a and 1b where FIG. 1b is a 90 degree side view of FIG. 1a with an added set screw 146.

FIG. 1a shows a rod fixture 110 that includes a base 131, a rod block 130 and a bar block 129. In on embodiment the base, rod block and bar block are permanently attached or formed from one contiguous piece of material. The rod fixture is preferably made from metal including steel, stainless steel, aluminum, titanium or a combination there of. The rod fixture may in on embodiment be made of any substance known in the art including plastic, carbon fibers or the like.

The rod block 130 in one embodiment may include as shown in FIG. 1a the base 131 affixed to a side member 137. The side member 137 affixed to the rod cap 134, forming a rod slot 132. The base 131, side member 137 and cap 134 may be permanently attached to one another or formed from one contiguous piece of material.

The rod slot 132 in one embodiment may be contoured to fit a particular flight control rod in a particular aircraft. The flight control rod may be for a military aircraft including the, F-15, F-16, C-17, C-130, B-52, B-52 and B-1. The flight control rod may be for an aileron, ruder, flap or other control surface. The rod slot is preferably curved for a curved control rod and flat for a control rod with a flat surface (not shown).

The base 131 of FIG. 1a may optionally include a base screw 145 protruding and operably attached to the base 131 through a base screw access 135. The base screw 145 may be used to temporarily or removably attach the rod fixture 110 to the control rod. The base screw 145 pushes the flight control rod up into the to the rod slot 132 and hold the entire apparatus in place.

A bar slot 126 may extend from the rod slot 132, up through the rod cap 134 into the bar block 129. The bar slot in one embodiment is sized to fit the bar. Fit may include lateral support of the bar.

FIG. 1b illustrates on embodiment of the rod fixture 110 wherein the bar block 129 of FIG. 1a may optionally include a set screw 146 protruding and operably attached to the bar block 129. The set screw 146 may be used to temporarily or removably attach or hold a bar (not shown) firmly against the control rod (not shown) in the rod slot 132. The set screw 146 pushes the bar portion inserted in the bar slot 126, down onto the flight control rod.

FIG. 2 is an illustration of one embodiment of a rod fixture 210 having a the first bar block 229 with a locking pin 222. The first bar block 229 preferably affixed to the rod block 230. The rod block 230 having a first base 231 affixed to a first side member 237. The first side member 237 affixed to a first rod cap 234 forming a first rod slot 232. A bar rest 221 horizontal to a rod slot apex 2321 such that when the bar is installed on the rod fixture 210 it would rest upon the bar rest 221, resulting in a known gap between the bar and the control rod. The known gap may be about zero, about 1 mm or less, about 1 to about 5 mm or any other measurable design gap specification.

FIG. 3 is an illustration of one embodiment of a rod fixture 310 having a the first bar block 329 with a bar slot 326. The bar slot 326 having a bar slot top 3262 and bar slot base 3261 wherein the bar (not shown) is inserted through the bar slot top 3262 and secured against the bar slot base 3261 with a set screw 346 which in at least one embodiment inserts into the bar slot, is operably attached to the bar block 329 within the bar slot 326. The set screw 346 may be used to temporarily or removably attach or hold the bar (not shown) firmly against the bar slot base 3261. The base screw 345 may be inserted into the base screw access 335 and used to secure the flight control rod in the rod slot 332. In one embodiment this results in a measurable gap with a design limit to assess the straightness of a flight control rod.

The set screw and base screw may be any screw known in the art. They may also be any other attachment means know in the art. Operably attached included a screw that operates as designed and either removable or installed such that it cannot be completely detached from the rod fixture. The set screw and base screw may be hand tightened or tightened with a tool but they need not be excessively tightened. Too much torque could damage the flight control rod.

Figure 4:
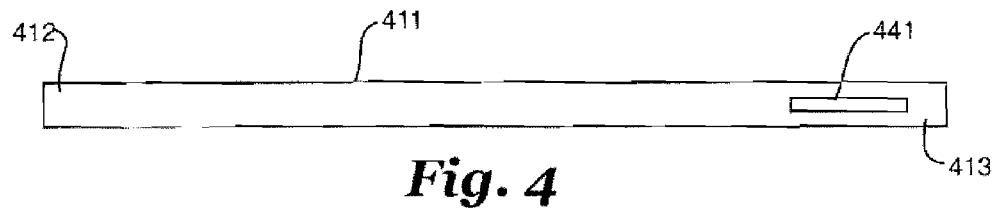
FIG. 4 is an illustration of one embodiment of a solid straight bar.

FIG. 4 illustrates one embodiment of the bar 411 with a first end 412 and an optional locking slot 441 at a second end 413. The bar in at least one embodiment is straight, stiff with minimum flexibility and smooth sufficient to facilitate accurate gap assessments between the bar and the control rod when installed. The bar 411 in one embodiment is made of metal wherein the metal is polished. The bar 411 may alternatively be made of plastic or carbon composites.

In one embodiment the locking slot 441 may be used with the rod fixture of FIG. 2 wherein locking pin 222 fits in the locking slot, removably connecting the bar 411 and the rod fixture 210 such that a reliable and sufficiently accurate gap measurement may be obtained. The rod fixture 210 may be used at one or more bar ends. Any combination of rod fixture embodiments may be used together for particular applications.

The gap between the bar and the flight control rod may be measured by any means known in the art including but not limited to feeler gages, rulers, micrometers, lasers and the like. In one embodiment the measured gap is preferably less than about 0.10 inch.

Figure 5:
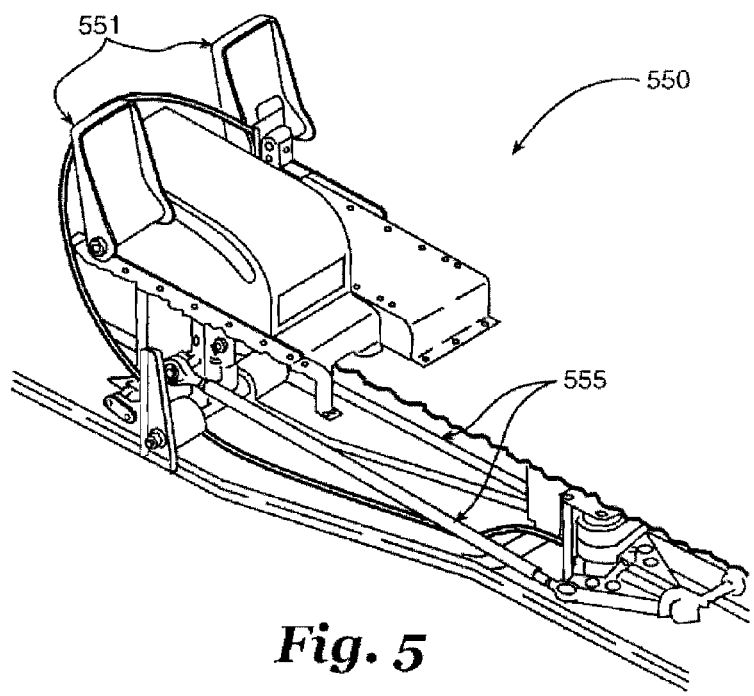
FIG. 5 is an illustration of installed flight control rods.

FIG. 5 is an illustration of an installed flight control rod 555 portion of a flight control system 550. The flight control rods 555 are in the illustrated embodiment controlled by peddles 551 which are manipulated by a pilot (not shown) to fly the aircraft. The control rods 555 are in a relatively tight space with limited access and room for measuring. The present invention provides a means for measuring the control rods without removing them. The apparatus herein disclosed facilitates a method of assessing the straightness of a flight control rod while installed in an aircraft. This method may include assembling two rod fixtures and a straight bar as shown in FIG. 6. The flight control rod is shown removed from the flight control system of FIG. 5 to facilitate illustration. The rod fixture 610 and rod fixture 710 are attached to the flight control rod 660 by any means known in the art, several of which are disclosed above and illustrated in FIGS. 1-3. A plurality of the gaps may be measured as required between the bar 611 and the flight control rod 660 as necessary to adequately assess the flight control rod 660 straightness and suitability for continued use. The bar 611 and rod fixtures 610 and 710 may further be rotated about the flight control rod 660 to measure straightness in a different plane as needed to assure straightness. If necessary, the rod fixtures and or bar may be loosened as necessary before rotation and optionally retightened. Once rotated the plurality of gaps may be re-measured between the bar and the flight control rod to determine if the flight control rod is straight enough for continued use. The rotation about the may be in any increments. In one embodiment the rotation about the control rod is in increments of at least ten degrees.

The specific pass and fail criteria may be different for different flight control rods in different aircraft.

Because the system works with installed flight control rods it may also have applicability in other embodiments for measuring the straightness of installed components having limited access.

While specific embodiments have been described in detail in the foregoing description and illustrated in the drawings, those with ordinary skill in the art may appreciate that various modifications to the details provided could be developed in light of the overall teachings of the disclosure.

What is claimed is:

1. An apparatus for assessing the straightness of a flight control rod installed in an aircraft comprising:
   a solid straight bar with a first end and a second end;
   a first rod fixture having a first bar block;
      the first bar block having a first bar slot, the first bar block affixed to a first rod block;

the first rod block having a first base affixed to a first side member, the first side member affixed to a first rod cap forming a first rod slot;

a second rod fixture having a second bar block;

the second bar block having a second bar slot, the second bar block affixed to a second rod block;

the second rod block having a second base affixed to a second side member, the side member affixed to a rod cap forming a second rod slot;

the first bar end removably inserted into the first bar slot, the second bar end removably inserted into the second bar slot, the flight control rod removably inserted into the first rod slot and the second rod slot with a measurable gap between the bar and the flight control rod.

2. The apparatus of claim 1 wherein the first base includes a first base screw protruding and operably attached to the first base the first base screw removably attaching the first rod fixture to the flight control rod, the flight control rod disposed in the first rod slot; and the second base includes a second base screw protruding and operably attached to the second base; the second base screw removably attaching the first rod fixture to the flight control rod disposed in the second rod slot.

3. The apparatus for assessing the straightness of a flight control rod installed in an aircraft of claim 1 wherein the first and second bar slot respectively extend into and about above the rod block into the bar block; and further does not extend completely through the bar block.

4. The apparatus of claim 1 wherein the first and second bar slot respectively extend above the rod block through the bar block; and wherein the bar end is removably inserted into the bar slot and held in place by a set screw removably inserted into a portion of the bar slot above the bar end.

5. The apparatus of claim 1 wherein the gap is measured with a feeler gage.

6. An apparatus for assessing the straightness of a flight control rod installed in an aircraft comprising:

a solid straight bar with a first end having a first locking slot and a second end having a second locking slot;

a first rod fixture having a first bar block;

the first bar block having a first locking pin, the first bar block affixed to a first rod block, the first rod block having a first base affixed to a first side member, the first side member affixed to a first rod cap forming a first rod slot;

a second rod fixture having a second bar block;

the second bar block having a second locking pin, the second bar block affixed to a second rod block;

the second rod block having a second base affixed to a second side member, the side member affixed to a rod cap forming a second rod slot;

the first locking slot removably inserted into the first locking pin, the second locking slot removably inserted into the second locking slot, the flight control rod removably inserted into the first rod slot and the second rod slot with a measurable gap between the bar and the flight control rod.

7. The apparatus for assessing the straightness of a flight control rod installed in an aircraft of claim 1 wherein the first base includes a first base screw protruding and operably attached to the first base the first base screw removably attaching the first rod fixture to the flight control rod, the flight control rod disposed in the first rod slot; and the second base includes a second base screw protruding and operably attached to the second base; the second base screw removably attaching the first rod fixture to the flight control rod disposed in the second rod slot.

8. The apparatus of claim 1 wherein the gap is measured with a feeler gage.

9. A method of assessing the straightness of a flight control rod while installed in an aircraft, the method comprising:

assembling two rod fixtures and a straight bar;

attaching the rod fixtures to the flight control rod;

measuring a plurality of gaps between the bar and the flight control rod;

rotating the bar and rod fixtures about the flight control;

remeasuring a plurality of second gaps between the bar and the flight control rod;

using the plurality of gap measurement results to determine if the flight control rod is straight enough for continued use.

10. The method of claim 9 wherein the method further includes loosening the rod fixtures before rotating the bar and rod fixtures and tightening the rod fixtures before remeasuring the gap.

11. The method of claim 9 wherein the rotation about the control rod is in increments of at least ten degrees.

12. The method of claim 9 wherein the method further includes first tightening the rod fixtures to the flight control with a base screw and then tightening the straight bar with a set screw.

* * * * *